(12) United States Patent
Abe et al.

(10) Patent No.: US 7,549,923 B2
(45) Date of Patent: Jun. 23, 2009

(54) GAME APPARATUS AND STORAGE MEDIUM STORING GAME PROGRAM

(75) Inventors: Goro Abe, Kyoto (JP); Kyoko Watanabe, Kyoto (JP); Ryutaro Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 722 days.

(21) Appl. No.: 10/901,234

(22) Filed: Jul. 29, 2004

(65) Prior Publication Data

US 2005/0049045 A1 Mar. 3, 2005

(30) Foreign Application Priority Data

Aug. 25, 2003 (JP) ............................ 2003-300362

(51) Int. Cl.
*G06F 17/00* (2006.01)
(52) U.S. Cl. ...................................... 463/31
(58) Field of Classification Search .................... 463/31
See application file for complete search history.

(56) References Cited

U.S. PATENT DOCUMENTS

| 5,921,864 | A | * | 7/1999 | Walker et al. | ................... | 463/9 |
| 6,155,924 | A | * | 12/2000 | Nakagawa et al. | ............. | 463/4 |
| 6,565,437 | B2 | * | 5/2003 | Orui | ............................. | 463/29 |
| 6,824,469 | B2 | * | 11/2004 | Allibhoy et al. | ............... | 463/40 |
| 7,229,349 | B2 | * | 6/2007 | Yamada | .......................... | 463/9 |
| 2001/0024971 | A1 | * | 9/2001 | Brossard | ...................... | 463/30 |
| 2002/0160835 | A1 | * | 10/2002 | Fujioka et al. | ................ | 463/31 |
| 2003/0139210 | A1 | * | 7/2003 | Raben | ........................... | 463/9 |
| 2005/0014563 | A1 | * | 1/2005 | Barri | .......................... | 463/43 |
| 2007/0072675 | A1 | * | 3/2007 | Hamano et al. | ............... | 463/42 |

OTHER PUBLICATIONS

OthelloWorld24; http://othello.gamespace24.net; searched as of Jul. 2003.
Nintendo; http://www.nintendo.co.jp/ngc/gmpj/what/index.html; searched as of Jul. 2003.
"Weekly Famitsu," vol. 17, No. 24, Enterbrain, Inc., Jun. 14, 2002, p. 217. With partial translation.
"Mycom BASIC Magazine," vol. 15, No. 12, Denpa-Shinbunsha, Dec. 1, 1996, pp. 162-166. With partial translation.

* cited by examiner

*Primary Examiner*—John M Hotaling, II
*Assistant Examiner*—Masud Ahmed
(74) *Attorney, Agent, or Firm*—Nixon & Vanderhye P.C.

(57) ABSTRACT

A game apparatus includes: a plurality of operation controllers to be operated by separate players; obtained partial area storage locations for storing a partial area obtained by each player as an obtained partial area; a partial area choice mechanism for allowing each player to choose a partial area in turns; a single-player-mode game execution mechanism for, when a partial area is chosen, executing a single-player-mode game for a player who has chosen the partial area; and an obtained partial area adding mechanism for, depending on a result of the single-player-mode game, storing the partial area chosen by the player who has played the single-player-mode game as an obtained partial area of the players in the obtained partial area storage locations.

22 Claims, 11 Drawing Sheets

F I G. 1
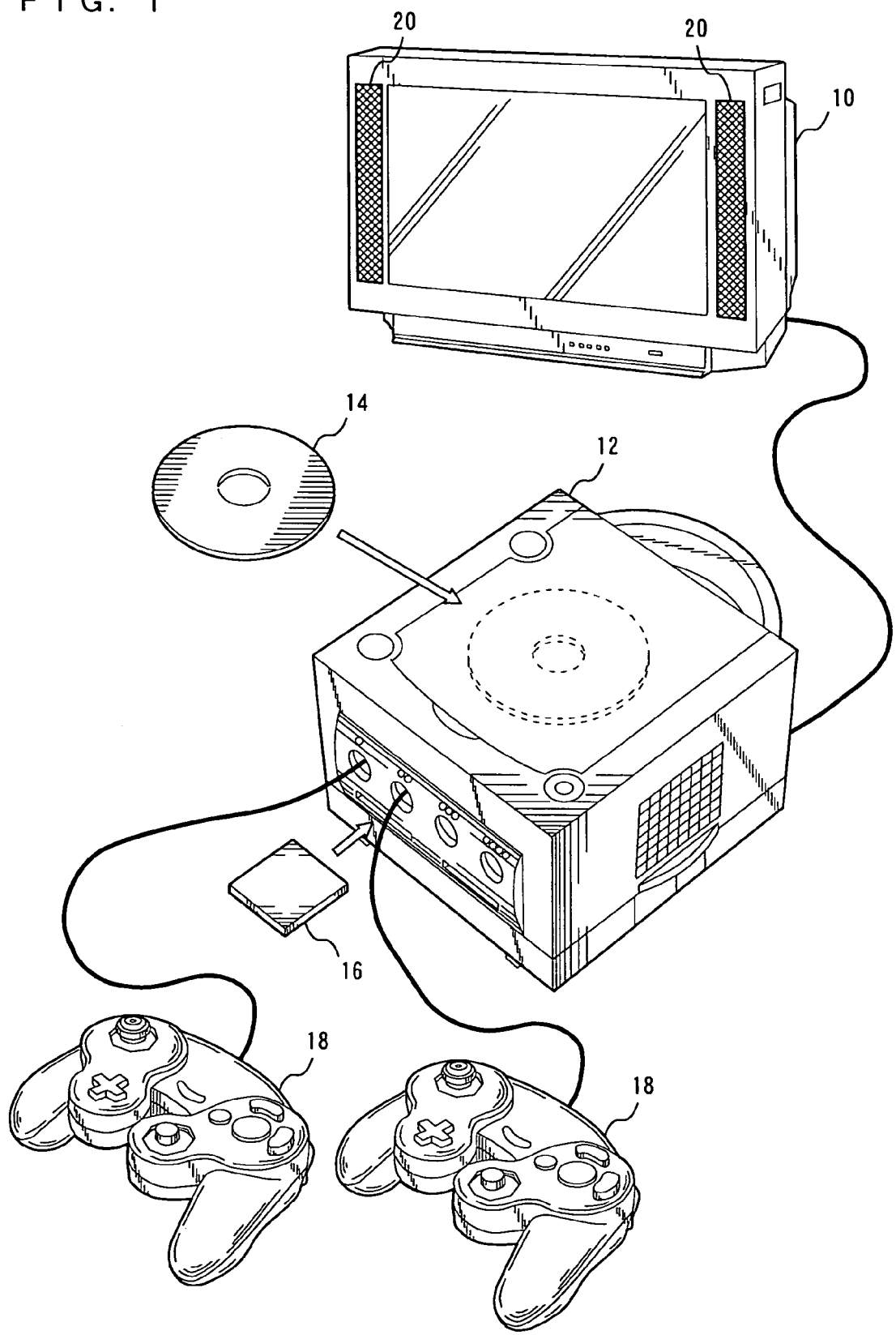

F I G. 2
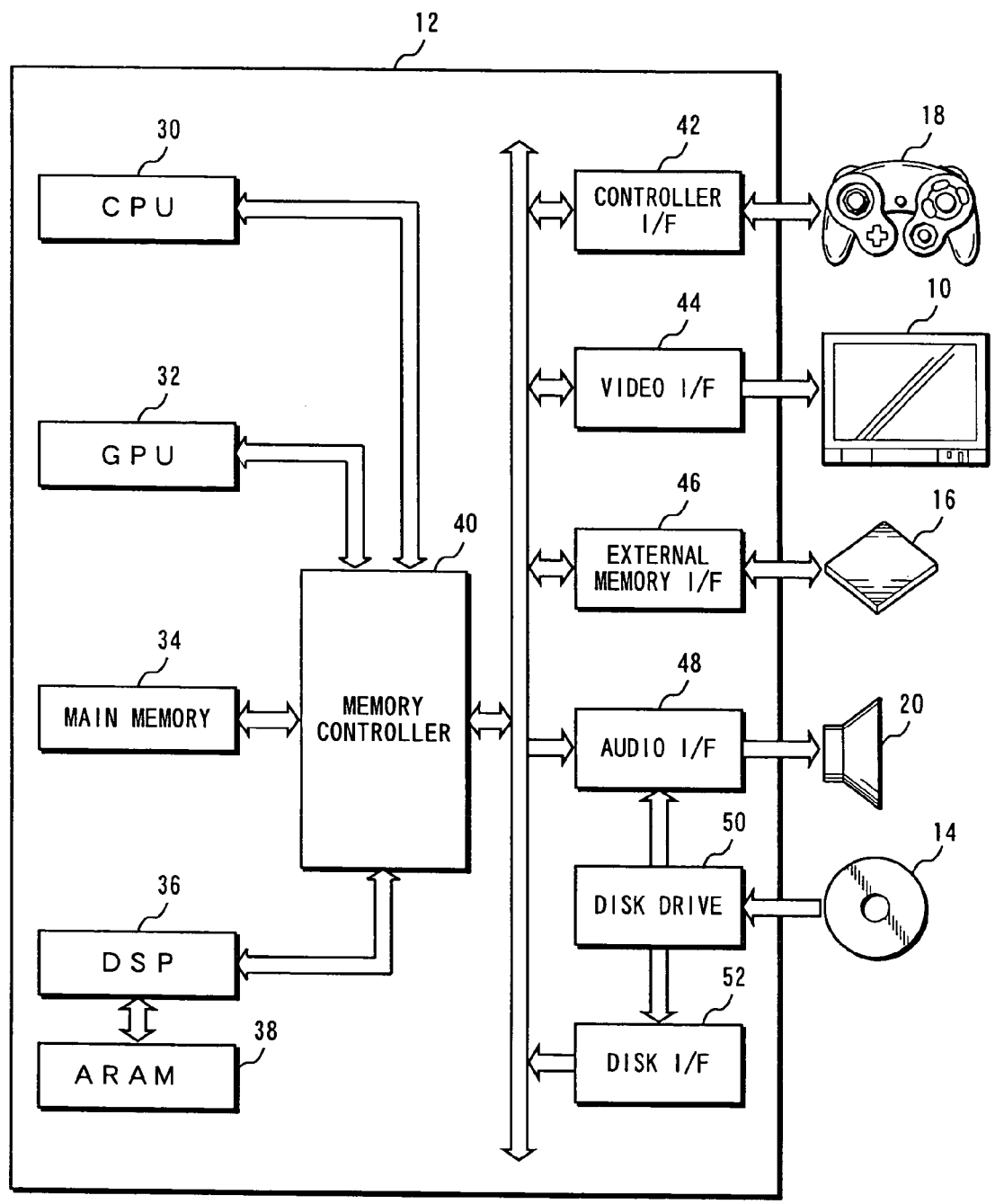

FIG. 3

| P1 | P2 | P3 | P4 | P5 |
|----|----|----|----|----|
| P6 | P7 | P8 | P9 | P10 |
| P11 | P12 | P13 | P14 | P15 |
| P16 | P17 | P18 | P19 | P20 |
| P21 | P22 | P23 | P24 | P25 |

| 5 | 3 | 4 | 3 | 5 |
|---|---|---|---|---|
| 3 | 3 | 3 | 3 | 3 |
| 4 | 3 | ★ | 3 | 4 |
| 3 | 3 | 3 | 3 | 3 |
| 5 | 3 | 4 | 3 | 5 |

| 5 | 3 | 4 | 3 | 5 |
|---|---|---|---|---|
| 3 | 3 | 3 | 3 | 3 |
| 4 | 3 | ★ | 3 | 4 |
| 3 | 3 | 3 | 3 | 3 |
| 5 | 3 | 4 | 3 | 5 |

CURSOR, P14

FIG. 6
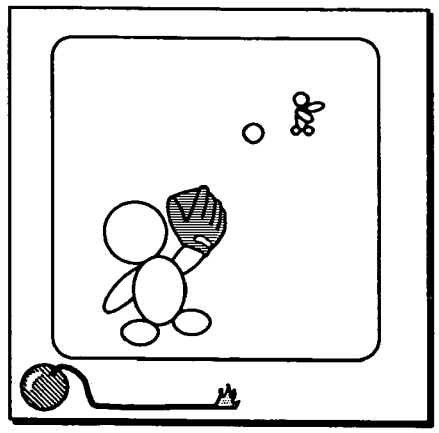
FIG. 7
| 5 | 3 | 4 | 3 | 5 |
|---|---|---|---|---|
| 3 | 3 | 3 | 3 | 3 |
| 4 | 3 | ★ | 1 | 4 |
| 3 | 3 | 3 | 3 | 3 |
| 5 | 3 | 4 | 3 | 5 |
FIG. 8
| 5 | 3 | 4 | 3 | 5 |
|---|---|---|---|---|
| 3 | 3 | 3 | 3 | 3 |
| 4 | 3 | ★ | 0 | 4 |
| 3 | 3 | 3 | 3 | 3 |
| 5 | 3 | 4 | 3 | 5 |
 PLAYER A

| | NUMBER OF OBTAINED PANELS | | |
|---|---|---|---|
| | FEW ← | | → MANY |
| BASE VARIABLE / BIAS VARIABLE | 0 | 1 | 2 |
| 0 | 0 | 1 | 2 |
| −1 | 0 | 0 | 1 |
| −2 | 0 | 0 | 0 |

GAME APPARATUS AND STORAGE MEDIUM STORING GAME PROGRAM

FIELD OF THE TECHNOLOGY

This technology relates to a game apparatus and a storage medium storing a game program and more particularly to a game apparatus and a storage medium storing a game program for realizing a game in which a plurality of players strive with one another to obtain as many partial areas as possible from among a plurality of partial areas constituting a predetermined area displayed on a game screen.

BACKGROUND AND SUMMARY

There has been a game generally known for many years as the "othello game." Since its inception as a TV game, it has also been enjoyed as a TV game. Even nowadays, it can be played as a competition game on a personal computer, see www website othello.gamespace24.net [searched as of Jul. 15, 2003].

Other than the othello game, there is known to be a class of competition games which are played by a plurality of players sharing one TV screen. Particularly, "Mario Party®," which is marketed by the applicant, see www website nintendo.co.jp/ngc/gmpj/what/index.htm [searched as of Jul. 15, 2003], and the like, which contain a lot of relatively small-scale games ("mini games") in which players take points from or compete with one another with different game characters operated by the players, so that the games can be played more enjoyably.

In the othello game, however, the development of the game is monotonous because it is prescribed so that players can place their pieces on the board whenever their turns come, that is, that the players place their pieces on the board in turns.

In addition, in a common party game, because a plurality of players compete with one another while playing respective mini games concurrently, the development of competition depends on the differences in competence (i.e., skill in playing games) between the players. Consequently, if the difference in competence between the players is large, a player of great competence will hold an overwhelmingly dominant position from start to finish, making the development of the game so one-sided that the enjoyment of the game will be spoiled.

Therefore, a feature of the illustrative embodiment is to realize, in connection with a game in which a plurality of players strive with one another to obtain as many partial areas as possible from among a plurality of partial areas constituting a predetermined area displayed on a game screen, a game where the development of the game does not become monotonous and where each player can enjoy playing the game even when the difference in competence between the players is large.

To attain the feature above, the illustrative embodiments have adopted the following features. Note that the reference numerals within parentheses, which are provided only for showing correspondences to drawings to facilitate the understanding of the exemplary embodiment, do not restrict the scope of the exemplary embodiment in any manner.

A game apparatus according to a first aspect of the illustrative embodiments is a game apparatus for executing a game in which a plurality of players strive with one another to obtain one or more partial areas from among a plurality of partial areas constituting a predetermined area displayed on a game screen, and the game apparatus comprises a plurality of operation means (18) to be operated by separate players, obtained partial area storage means (78) for storing a partial area obtained by each player as an obtained partial area, partial area choice means (30), single-player-mode game execution means (30), and obtained partial area adding means (30). The partial area choice means allows each player to choose a partial area in turns (S12). The single-player-mode game execution means, when a partial area is chosen, executes a single-player-mode game for a player who has chosen the partial area (S15). The obtained partial area adding means stores, as an obtained partial area of the present player, the partial area chosen by the player who has played the single-player-mode game in the obtained partial area storage means, depending on the result of the single-player-mode game (S20).

In a second aspect based on the first aspect, the single-player-mode game execution means chooses one single-player-mode game at random from among a plurality of previously-prepared single-player-mode games and executes the chosen single-player-mode game (S13).

In a third aspect based on the first aspect, the game apparatus further comprises stipulated number storage means (78) for storing a stipulated number which is assigned to each partial area, and stipulated number update means (30, S18) for reducing the stipulated number for the partial area as stored in the stipulated number storage means if the result of the single-player-mode game executed when the partial area is chosen satisfies a predetermined requirement, wherein: if a player plays a single-player-mode game and the result of the single-player-mode game satisfies the predetermined requirement, the single-player-mode game execution means executes another single-player-mode game for the same player in succession; if a player plays a single-player-mode game and as a result the stipulated number for a partial area in the stipulated number storage means becomes zero, the obtained partial area adding means stores the partial area as an obtained partial area of that player's in the obtained partial area storage means; and if the result of the single-player-mode game does not satisfy the predetermined requirement or if the stipulated number for a partial area in the stipulated number storage means becomes zero, the partial area choice means allows the next player to choose a partial area. Here, the "predetermined requirement" may vary with each single-player-mode game.

In a fourth aspect based on the third aspect, the game apparatus further comprises play history information storage means (74) for storing, as play history information, a playing result of a single-player-mode game played by a player, wherein, based on the play history information stored in the play history information storage means, the single-player-mode game execution means executes a single-player-mode game with an increased speed of game progress as the number of single-player-mode games the player has played in succession increases.

In a fifth aspect based on the third aspect, different stipulated numbers are initially assigned to at least two of the plurality of partial areas in the stipulated number storage means.

In a sixth aspect based on the third aspect the game apparatus further comprises obtained partial area change means (30, 62) for changing, in the obtained partial area storage means, a partial area of a player which is sandwiched between a partial area added by the obtained partial area adding means and a partial area which is already possessed by a player who has obtained the added partial area to become an obtained partial area of the player who has obtained the added partial area, wherein, the predetermined area and the plurality of partial areas are rectangular areas, and in the stipulated number storage means, a larger stipulated number is initially assigned to a partial area (P1) placed in a corner of the predetermined area than for a partial area placed in a non-corner location of the predetermined area.

In a seventh aspect based on the first aspect, the single-player-mode game execution means executes a single-player-mode game having a degree of difficulty which varies according to the number of obtained partial areas of each player as stored in the obtained partial area storage means.

In an eighth aspect based on the first aspect, the game apparatus further comprises play history information storage means (74) for storing, as play history information, a playing result of a single-player-mode game played by a player, wherein the single-player-mode game execution means executes a single-player-mode game having a degree of difficulty which varies according to the play history information stored in the play history information storage means.

In a ninth aspect based on the first aspect, the game apparatus further comprises obtained partial area change means (30, 62) for, if a player newly obtains a partial area and the newly obtained partial area is in a predetermined positional relationship with respect to an obtained partial area of another player, changing, in the obtained partial area storage means, the obtained partial area of the other player to become an obtained partial area of the player who has newly obtained the partial area.

In a tenth aspect based on the first aspect, the game apparatus further comprises: all-player-mode game execution means (30, S41) for executing an all-player-mode game which is capable of being played concurrently by all of the plurality of players in response to a prescribed number of partial areas having been obtained; and pilfering process means (30, S43) for changing, in the obtained partial area storage means, an obtained partial area of a player to become an obtained partial area of another player based on the result of the all-player-mode game.

In an eleventh aspect based on the first aspect, the game apparatus further comprises: victor determination means (30, S24) for, when all of the plurality of partial areas contained in the predetermined area have been obtained by the plurality of players, determining one player of the plurality of players as a victor (e.g., a player who has obtained the greatest number of partial areas, or a player who has obtained a previously-designated partial area) by considering the partial area or areas obtained by each player; and special game execution means (30, S26) for executing a single-player-mode special game which is executed for the victor on a game field corresponding to the predetermined area in which only portions corresponding to the obtained partial areas of the victor are made visible.

A storage medium according to a twelfth aspect of the illustrative embodiments is a storage medium storing a game program for causing a computer in a game system to execute a game in which a plurality of players strive with one another to obtain one or more partial areas from among a plurality of partial areas constituting a predetermined area displayed on a game screen, wherein, the game system includes a plurality of operation means (18) to be operated by separate players and obtained partial area storage means (78) for storing a partial area obtained by each player as an obtained partial area, and the game program causes the computer to function as partial area choice means, single-player-mode game execution means, and obtained partial area adding means. The partial area choice means allows each player to choose a partial area in turns (S12). The single-player-mode game execution means, when a partial area is chosen, executes a single-player-mode game for a player who has chosen the partial area (S15). The obtained partial area adding means stores the partial area chosen by the player who has played the single-player-mode game as an obtained partial area of the player in the obtained partial area storage means, depending on the result of the single-player-mode game (S20).

In accordance with the game apparatus of the first aspect, in connection with a game in which a plurality of players strive with one another to obtain one or more partial areas from among a plurality of partial areas constituting a predetermined area displayed on a game screen, a game is realized whose development does not become monotonous and which each player can enjoy playing even when the difference in competence between the players is large. Specifically, the development of the game does not become monotonous as it would in the othello game because, although each player chooses a partial area in turns, even if a turn to choose a partial area comes to a player, it still depends on the result of a single-player-mode game whether the player can obtain the partial area. Moreover, whether the player can obtain the partial area depends solely on whether the player will successfully clear the single-player-mode game, rather than whether the player is more skilled in playing games than other players. Therefore, even if the difference in competence between the players is large, the development of the game does not become one-sided (i.e., only one particular player continuing to obtain more and more partial areas), and each participating player can enjoy playing the game.

In accordance with the game apparatus of the second aspect, a player is unable to know which single-player-mode game he or she will play until the single-player-mode game is actually started. As a result, there is an enjoyment derived from the unpredictability as to which single-player-mode game will be played. Moreover, the development of the game can be prevented from becoming monotonous.

In accordance with the game apparatus of the third aspect, the number of times a single-player-mode game should be played to obtain a partial area is predetermined with respect to each partial area, so that a partial area which can be obtained relatively easily and a partial area which can be obtained with more difficulty will arise. As a result, strategic thoughts are required in choosing a partial area.

In accordance with the game apparatus of the fourth aspect, when a partial area which still has a large stipulated number is chosen, the degrees of difficulty of single-player-mode games gradually become higher as a player continues to succeed in more single-player-mode games. As a result, a sophisticated strategy will be required in choosing a partial area. For example, the player will be faced with the difficult question of whether to attack a high-stipulated-number partial area which is difficult to obtain or to safely obtain a partial area whose stipulated number is small.

In accordance with the game apparatus of the fifth aspect, a strategy will be required in choosing a partial area. For example, a player will be faced with the difficult question of whether to attack a high-stipulated-number partial area which is difficult to obtain or to safely obtain a partial area whose stipulated number is small.

In accordance with the game apparatus of the sixth aspect, the stipulated numbers for the partial areas placed in the corners of the predetermined area, which cannot be sandwiched between partial areas of another player's, are set to be larger than those for the other partial areas. As a result, in the situation where a player can take a partial area(s) from another player by sandwiching them with his or her own partial areas during the game, amore sophisticated strategy will be required in choosing a partial area. For example, the player will be faced with the difficult question of whether to attack a high-stipulated-number partial area in a corner, which is difficult to obtain but which cannot be sandwiched by partial areas of another player's, or to safely obtain a low-stipulated-number partial area, which can be taken by another player easily. Notably, if a player attempts to obtain a partial area for which a larger stipulated number was assigned compared to other partial areas, and he or she fails to clear a second or later mini game of the mini games to be cleared for obtaining that partial area, it follows that a situation advantageous to other players emerges, which is to the player's disadvantage, because the right to choose a partial area is transferred to another player in a situation where the stipulated number for the partial area has been reduced by the number corresponding to the number of times the player has cleared a mini game. Thus, a strategy will be required in choosing a partial area.

In accordance with the game apparatus of the seventh aspect, the degree of difficulty of a single-player-mode game can be changed according to the number of obtained partial areas of each player. Therefore, by increasing the degree of difficulty of a single-player-mode game when a player attempts to newly obtain a partial area, as the number of partial areas already obtained by the player grows, for example, it becomes unlikely that the game develops so one-sidedly that only a particular player obtains most of the partial areas. Thus, each player can enjoy playing the game.

In accordance with the game apparatus of the eighth aspect, the degree of difficulty of a single-player-mode game can be changed according to the playing result(s) of a single-player-mode game(s) played by each player in the past. Therefore, for example, the game apparatus may be arranged so that each time a player fails to clear a single-player-mode game, the degree of difficulty of a single-player-mode game the player will play the next time is reduced. This prevents the problem of discouraging a player from playing a mini game because the degree of difficulty of the mini game is much too high for the ability of the player. Conversely, the degree of difficulty of a single-player-mode game may be increased as the number of single-player-mode games the player has successfully cleared increases. As a result, a player who is skilled in playing the single-player-mode games can be kept from becoming bored with the game due to his or her being able to clear single-player-mode games too easily, and, in addition, the game can be prevented from developing so one-sidedly that only the player obtains most of the partial areas.

In accordance with the game apparatus of the ninth aspect, it is possible to provide more thrilling game developments since a losing player may suddenly outdo the other players by taking partial areas already obtained by another player from him or her.

In accordance with the game apparatus of the tenth aspect, in the situation where a particular player is leading over the other players, it is possible to give a losing player a chance to reverse the situation. Therefore, it is unlikely that the game develops so one-sidedly that only a particular player obtains most of the partial areas. Thus, each participating player can enjoy playing the game.

In accordance with the game apparatus of the eleventh aspect, a player can play a special game in a more advantageous condition by achieving a victory with more partial areas having been obtained by him or her. Therefore, even in the situation where it is almost evident that a particular player will become the victor while partial areas are still being strived for by the players, the particular player will still want to obtain more partial areas, while the other players will strive to prevent it. Thus, each player can continue to enjoy the game to the end.

In accordance with the storage medium of the twelfth aspect, in connection with a game in which a plurality of players strive with one another to obtain one or more partial areas from among a plurality of partial areas constituting a predetermined area displayed on a game screen, a game is realized whose development does not become monotonous and where even when the difference in competence between the players is large, each player can enjoy playing the game.

These and other features, aspects, and advantages of the illustrative embodiments will become more apparent from the following detailed description of the exemplary embodiments presented herein when taken in conjunction with the accompanying drawings.

BRIEF DESCRIPTION OF THE DRAWINGS

FIG. 1 is an external view of a game system according to an exemplary embodiment;

FIG. 2 is a block diagram illustrating the internal structure of a main body of a game machine;

FIG. 3 is an exemplary arrangement of panels displayed on a game screen;

FIG. 4 is an exemplary game screen immediately after a game was started;

FIG. 5 is an exemplary game screen when a panel is chosen;

FIG. 6 is an exemplary game screen when a mini game is being executed;

FIG. 7 is an exemplary game screen a little while after the game was started;

FIG. 8 is another exemplary game screen a little while after the game was started;

DETAILED DESCRIPTION OF THE PREFERRED EMBODIMENTS

Figures 9, 10:
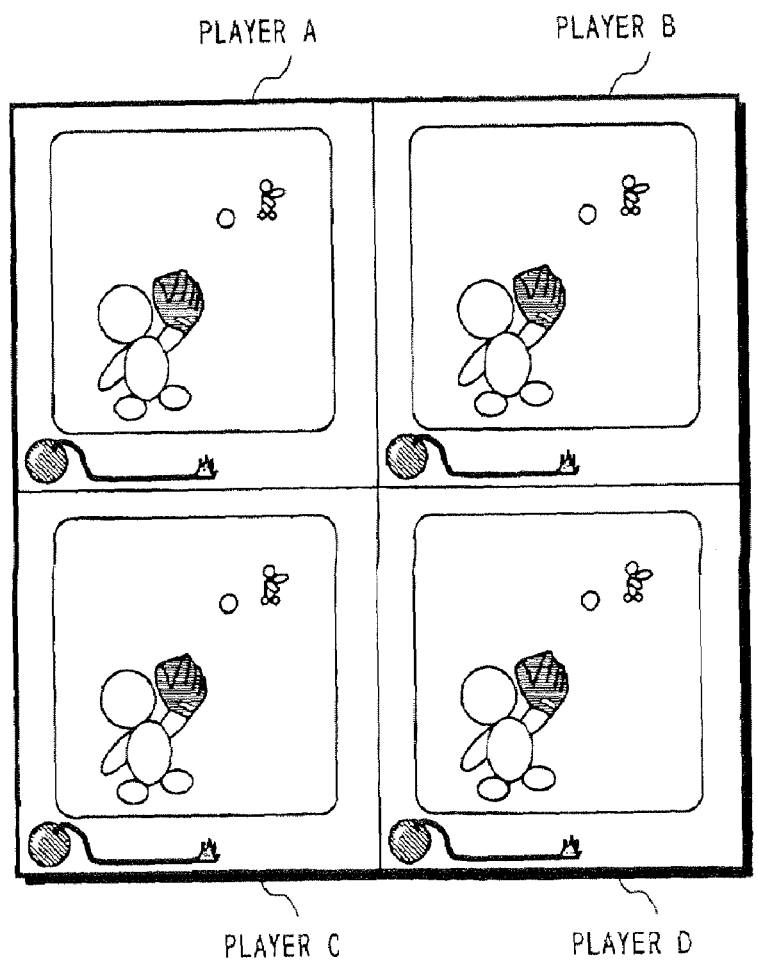
FIG. 9 is an exemplary game screen when the game has progressed to some extent.
FIG. 10 is an exemplary game screen at the time of a pilfering chance game.

With reference to the drawings, a game system according to an exemplary embodiment is described below.

FIG. 1 is an external view illustrating the structure of a game system according to an illustrative embodiment, and FIG. 2 is its block diagram. As shown in FIG. 1 and FIG. 2, the game system includes a TV monitor 10, a main body 12 of a game machine, a DVD-ROM 14, an external memory card 16, and a controller 18. The TV monitor 10 is equipped with a loudspeaker 20. The DVD-ROM 14 and the external memory card 16 are mounted to the main body 12 of the game machine such that it can be removed or inserted at will. The controller 18 is connected, via a communication cable, to one of a plurality of connectors for controller ports (four connectors are shown in FIG. 1) which are provided in the main body 12 of the game machine. The TV monitor 10 is connected to the main body 12 via an AV cable or the like. Note that the communication between the main body 12 and the controller 18 may be performed wirelessly. With reference to FIG. 2, each part of the game system is described in more detail below.

The DVD-ROM 14 stably stores a game program, game data, and the like. When a player plays the game, the DVD-ROM 14 is inserted into the main body 12. Note that as a means for storing a game program and the like, an external storage medium such as a CD-ROM, an MO, a memory card, a ROM cartridge, and the like, for example, may be used instead of a DVD-ROM 14.

The external memory card 16 is composed of a rewritable storage medium such as a flash memory or the like, for example, and records data such as "save data" of the game, for example.

The main body 12 reads the program stored in a DVD-ROM 14 and performs a process in accordance with the program.

The controller 18, which is an input device for a player to make an input relating to a game operation, has a plurality of operation switches. The controller 18 outputs operation data to the main body 12 in accordance with a pressing of an operation switch by a player or the like.

The TV monitor 10 displays image data outputted from the main body 12 on the screen, and outputs from the loudspeaker 20 audio which is outputted from the main body 12 during the game.

Next, the structure of the main body 12 is described. In FIG. 2, the main body 12 is equipped with a CPU 30 and a memory controller 40 connected thereto. Further, in the main body 12, the memory controller 40 is connected to a GPU (Graphic Processing Unit) 32, a main memory 34, a DSP 36, and various kinds of interfaces (I/F) 42, 44, 46, 48, and 52. The memory controller 40 controls the data transfer between these components.

When the game is started, a disk drive 50 drives the DVD-ROM 14 which has been inserted to the main body 12. The game program stored in the DVD-ROM 14 is read and loaded into the main memory 34 via the disk I/F 52 and the memory controller 40. The game is started by the CPU 30 executing the program in the main memory 34. After the game is started, a player performs an input to the controller 18 using an operation switch, e.g., an input pertaining to a game operation. In accordance with the player's input, the controller 18 outputs operation data to the main body 12. The operation data outputted from the controller 18 is provided to the CPU 30 via the controller I/F 42 and the memory controller 40. The CPU 30 performs a game process in accordance with the inputted operation data. In the generation of image data and the like in the game process, the GPU 32 or the DSP 36 is utilized. An ARAM 38 is utilized when the DSP 36 performs a process.

The GPU 32 generates image data to be displayed on the TV monitor 10 and outputs the image data to the TV monitor 10, when appropriate, via the memory controller 40 and the video I/F 44. Audio data which is generated in the CPU 30 when the game program is in execution is outputted through the memory controller 40 and the audio I/F 48 to the loudspeaker 20.

Next, an outline of the game which is executed in the game system according to the illustrative embodiment is described. Here, an exemplary case will be described where four players (players A to D) play the game together.

The game executed in the illustrative embodiment is a game in which a plurality of players strive with one another to obtain as many panels as possible from among twenty-five panels (panels P1 to P25) displayed on the TV monitor 10 as shown in FIG. 3. More specifically, players try to obtain one of the twenty-five panels in turns, and, as in the othello game, when a player's panel (s) sandwiches a different player's panel(s), the player can add the sandwiched panel(s) to his or her own possession.

FIG. 4 shows an exemplary screen displayed immediately after the game started. It is assumed that a separate game, hereinafter referred to as a "mini game," is to be played as a requisite to this game. In FIG. 4, a number is written on each panel. This number shows the number of times (hereinafter simply referred to as "a stipulated number") a player has to clear a mini game to obtain the panel. For example, to obtain panel P1, it is required to clear a mini game five times. Note that panel P13 at the center is a special panel, which can be obtained only when it becomes sandwiched between a player's panels. Therefore, no number is written on this panel.

Once the game starts, players each choose a panel in a predetermined order. It is assumed here that panels are to be chosen in the following order of players: player A, player B, player C, player D, player A, and so on.

First, player A, who is the first player entitled to choosing a panel, chooses a panel by moving a cursor as shown in FIG. 5, for example. It is preferable for the cursor to be controlled so that it can be moved only upon panels which are possible to be obtained, based on a choice determination program described later.

When player A chooses any one panel (which herein is assumed to be panel P14), a mini game starts. Player A plays the mini game seeing a game screen displayed on the TV monitor 10 as is shown in FIG. 6. The mini game which is executed at this time is chosen at random from among a plurality of previously-prepared mini games, and executed.

A requirement for clearing the mini game has been previously set, and if player A clears this mini game, another mini game is chosen at random from among the plurality of previously-prepared mini games and executed, and player A proceeds to play the newly executed mini game. In this manner, player A may play a mini game at most three times (which corresponds to the stipulated number assigned to the chosen panel) in succession.

If player A fails to clear any one mini game, the period during which player A is allowed to choose a panel ends at this point, and the right to choose a panel is transferred to player B, without allowing player A to obtain the panel he or she has chosen. At this time, however, the stipulated number assigned to panel P14, which player A chose, is reduced by the number of times player A has cleared a mini game. For example, if player A fails to clear a third mini game after clearing two mini games in succession, the stipulated number for panel P14 is reduced to one as shown in FIG. 7, and the right to choose a panel is transferred to player B.

On the other hand, if player A clears all of the three mini games, player A obtains panel P14. Then, as is shown in FIG. 8, panel P14 is colored to indicate that the possessor of panel P14 is player A (for example, panels of player A, player B, player C, and player D may be colored in yellow, red, blue, and green, respectively). Thereafter, the right to choose a panel is transferred to player B.

In the manner described above, players A to D take turns to choose a panel and play a mini game (s), and may obtain the panel depending on the result of the mini game(s). Note that, if a player newly obtains a panel and as a result a different player's panel(s) becomes sandwiched between the newly obtained panel and a panel already obtained by the player who has newly-obtained the panel, the different player's sandwiched panel(s) also becomes a possession(s) of the player who has newly obtained the panel. For example, if player A obtains panel P4 in the situation as shown in FIG. 9, panel P9 becomes player A's possession.

At a time when the total number of panels possessed by the players reaches a prescribed number (for example, twenty), a game named "pilfering chance" starts. The pilfering chance gives a player a chance to unconditionally obtain a panel that is already possessed by another player. Specifically, as is shown in FIG. 10, a screen on the TV monitor 10 may be divided into four parts, where players A to D play mini games concurrently. For example, player A may play a mini game while watching a game image displayed at the upper left of FIG. 10, and, in the same manner, player B, player C, and player D play mini games while watching game images displayed at the upper right, lower left, and lower right, respectively. Only those players who have cleared the mini games survive in the competition, and the surviving players go on to play more mini games. Mini games are thus executed until finally only one player survives. The player who has survived to the end is allowed to choose one panel possessed by another player and add it to his or her own possession. At this time, if a different player's panel(s) exists between the newly obtained panel and a panel already possessed by the surviving player, the surviving player takes the sandwiched panel(s) from the different player.

After the pilfering chance game ends, players A to D proceed to choose a panel and play a mini game (s) by taking turns in the same manner as before, and depending on the result of the mini game(s) may obtain a panel.

Figure 11:
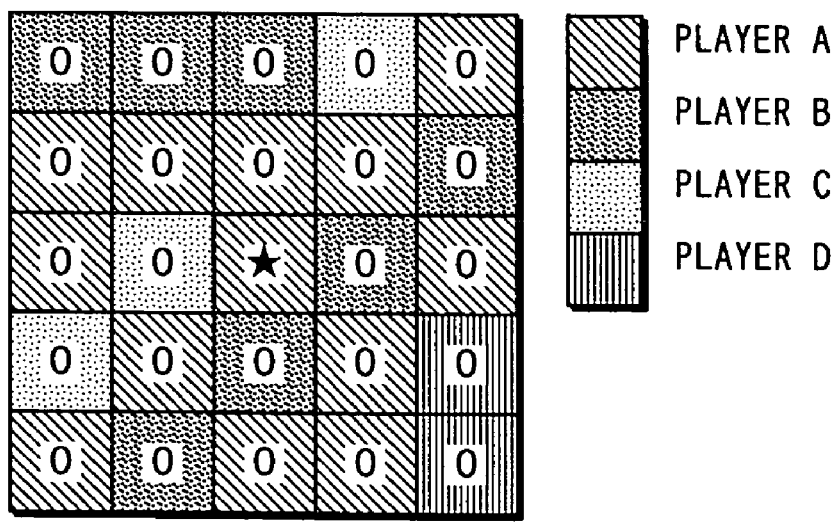
FIG. 11 is an exemplary game screen immediately after all of the panels have been obtained.

When all of the panels (panels P1 to P25) have finally been obtained by the players as shown in FIG. 11, the player who possesses the greatest number of panels (namely, player A in the example of FIG. 11) is decided as a provisional victor and a special game for that player starts. Note that if there is more than one player who possesses the greatest number of panels, a playoff game is played, and based on the result thereof a provisional victor is decided.

Figure 12:
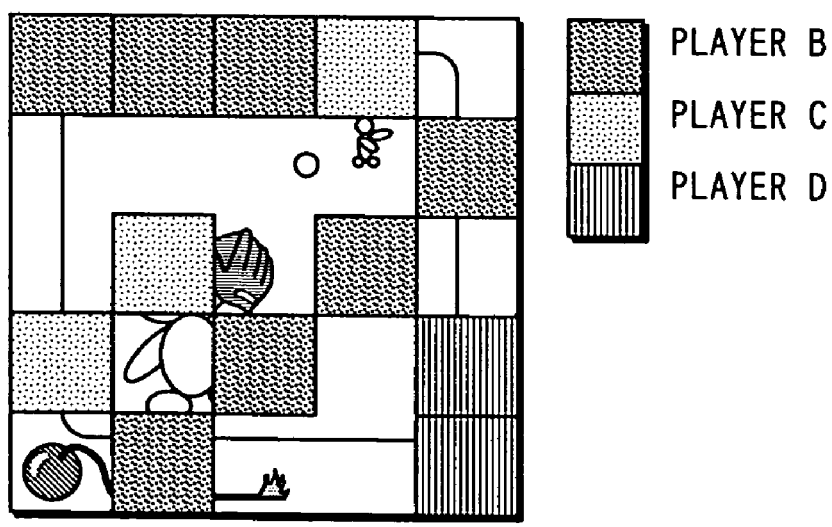
FIG. 12 is an exemplary game screen at the time of a special game.

In the special game, the provisional victor plays a mini game in a condition where the portions corresponding to the panels possessed by the other players are masked so as to be visually blocked, as shown in FIG. 12. If this mini game is cleared, the provisional victor becomes the final victor. If the provisional victor fails to clear the mini game, one of the other players (three players, in this example) becomes the final victor.

Next, the memory map of the DVD-ROM 14 is described with reference to FIG. 13. The program or data for realizing a game as described above is stored in the DVD-ROM 14. More specifically, a choice determination program 60, a panel reversal program 62, a pilfering process program 64, a masking process program 66, programs 68 of respective games, and other processing programs, various data, and the like are recorded on the DVD-ROM 14.

The choice determination program 60 determines which panel(s) can be chosen by a player based on how a panel(s) has been obtained by the players until the present time. The choice determination program 60 determines which panel(s) can be chosen by a player according to the following basic rules.

(1) A first panel to be chosen after the game has started must be chosen from among the panels which are contiguous (longitudinally, horizontally, or obliquely) to the panel at the center (panel P13).

(2) A panel to be chosen thereafter is chosen from among the panels which are contiguous (longitudinally, horizontally, or obliquely) to a panel(s) that is already possessed by any one player (as in the othello game).

(3) Each player, except when impossible, has to choose a panel such that another player's panel (s) becomes longitudinally, horizontally, or obliquely sandwiched between the newly obtained panel (that is, if successfully obtained) and a panel that has already been obtained by the choosing player (as in the othello game).

The panel reversal program 62 is a program which, when a player has newly obtained a panel, determines whether a different player's panel(s) is sandwiched between the newly obtained panel and another panel already obtained by the player who has obtained the newly obtained panel, and, if it is, changes the sandwiched panel(s) to that of the player who has obtained the newly obtained panel.

The pilfering process program 64 is a program which, when the total number of panels possessed by the players has reached a prescribed number (for example, twenty), causes all of the players to play a multi-player game as a pilfering chance game (it is assumed in the illustrative embodiment that all of the players concurrently play mini games, such that a player who fails to clear the mini game is eliminated from the competition, and a player who has survived to the end is decided as a victor in the pilfering chance game). The pilfering process program 64 decides a victor in the pilfering chance game based on the result thereof. Furthermore, the pilfering process program 64 grants the victor a panel as arbitrarily designated by the victor, and if another player's panel(s) becomes sandwiched between the panel which the victor has newly obtained and a panel already possessed by the victor, the pilfering process program 64 also grants the sandwiched panel(s) to the victor.

The masking process program 66 is a program which, when the provisional victor who possesses the greatest number of panels at the end of the game tries the special game, masks the panels possessed by the other players.

The programs 68 of respective games are programs for executing a plurality (e.g., more than two hundred kinds) of mini games, special games, and the like. The degree of difficulty of each game can be adjusted by increasing the speed of the progress of the game or the like.

The other processing programs include programs necessary for general processes such as image display, audio output, and the like. The various data includes image data, audio data, and the like.

Figure 14:
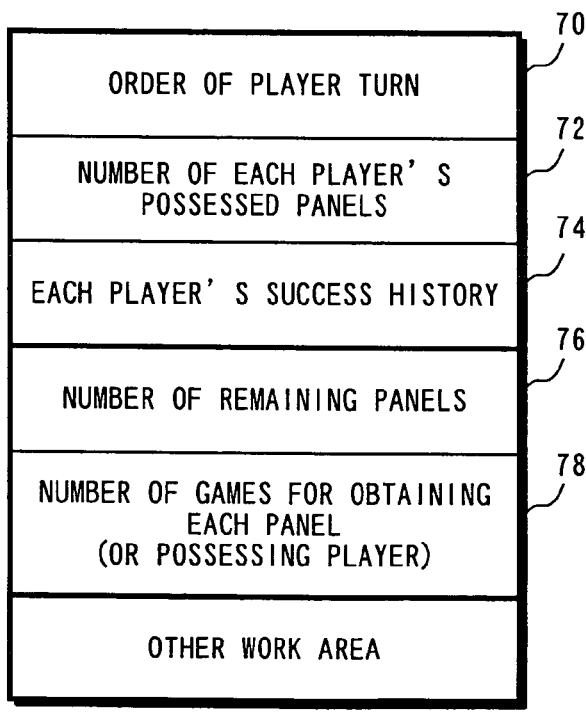
FIG. 14 is a memory map of a main memory.

Next, a memory map of the main memory 34 is described with reference to FIG. 14. As shown in FIG. 14, the main memory 34 includes: an order-of-player-turn storage area 70, a number-of-each-player's-possessed-panels storage area 72, an each-player's-success-history storage area 74, a number-of-remaining-panels storage area 76, a number-of-games-for-obtaining-each-panel (or possessing player) storage area 78, and "other work area."

The order-of-player-turn storage area 70 stores data showing an order in which players are allowed to choose a panel, i.e., an order in which the right to choose a panel is transferred among the players. This order is determined immediately after the game starts.

The number-of-each-player's-possessed-panels storage area 72 stores data showing the current number of panels possessed by each player.

The each-player's-success-history storage area 74 stores data showing the history of the results of a mini game(s) (whether he or she succeeded or failed in clearing the mini game (s)) which each player has attempted to clear so far.

The number-of-remaining-panels storage area 76 stores data showing the number of panels which are still left to be obtained by a player.

The number-of-games-for-obtaining-each-panel (or possessing player) storage area 78 stores the data showing the number of times (the "stipulated number") a mini game has to be cleared for obtaining each panel. This number of times is, as was described earlier, reduced each time a player clears a mini game which is executed when a panel is chosen, and when that number becomes zero, the panel becomes possessed by the player who cleared the last mini game. After the stipulated number becomes zero, data indicating the present possessor of the panel is stored.

The "other work area" is used, when necessary, for performing necessary calculations and storing temporary values, and the like. Also, data indicating how many mini games a player will have played in succession when he or she plays a next mini game (hereinafter referred to as "consecutively-played number data") is stored in this area. For example, when the right to choose a panel is transferred to the next player, the consecutively-played number data is reset to one, and every time the player clears a mini game the consecutively-played number is incremented. Note that if a player has played two mini games in succession and continues to play a third mini game, the consecutively-played number data indicates the value of three.

With reference to the flowchart shown in FIG. 15, an operation of a CPU 30 of the main body 12 is described below. The CPU 30 performs the processes shown in FIG. 15 according to the kinds of programs recorded in a DVD-ROM 14.

Figure 15:
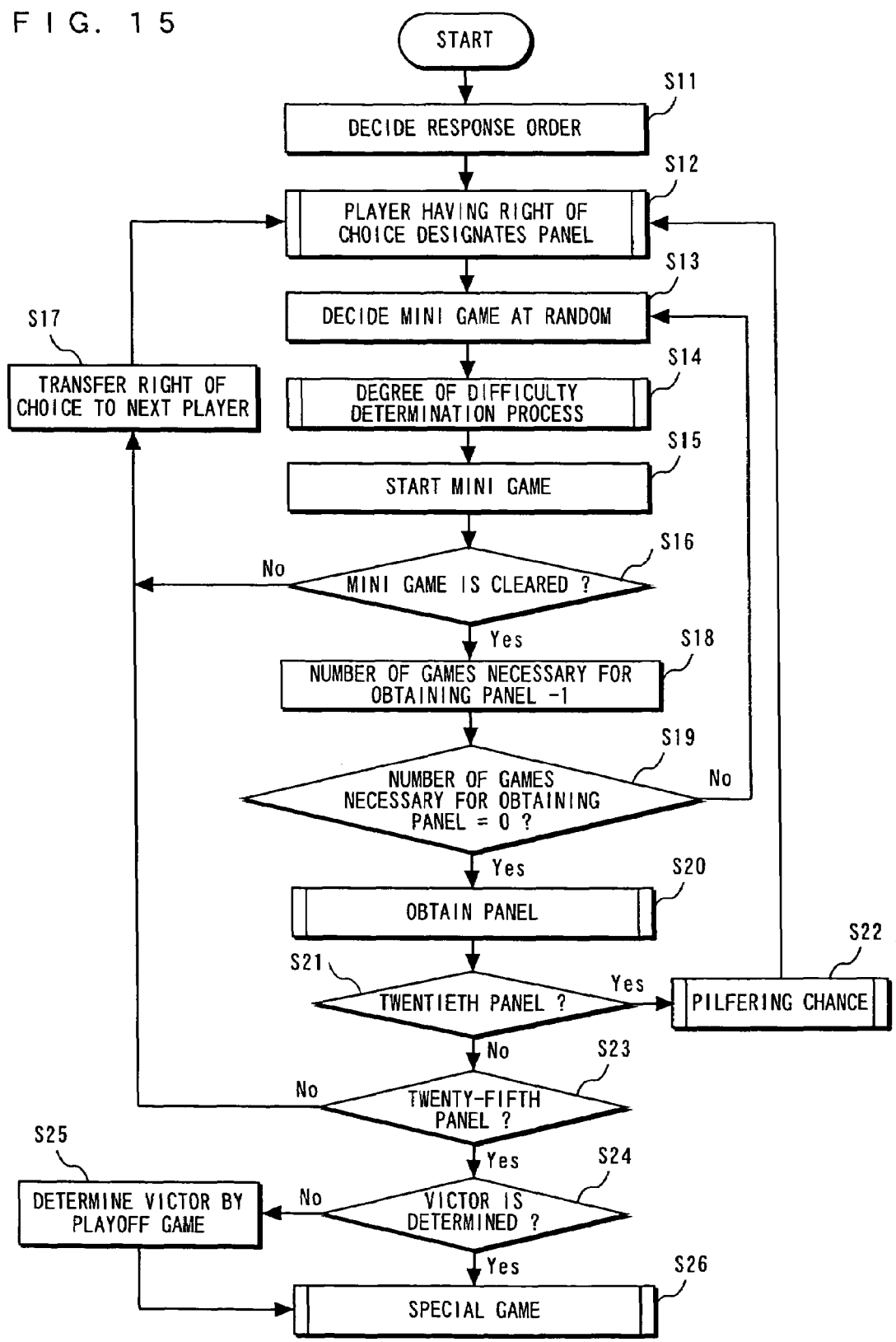
FIG. 15 is a flowchart illustrating the flow of a game process.

In FIG. 15, when a game starts, the CPU 30, at step S11, first determines a response order (i.e., the order in which the right to choose a panel is transferred among the players) and stores the determined order in the order-of-player-turn storage area 70 in the main memory 34. Hereafter, players choose a panel in this response order. The manner in which a response order is determined is arbitrary. The response order may be determined at random, for example.

At step S12, a player who has the right of choice chooses an arbitrary panel out of the panels from which the player is allowed to choose. The panel(s) from which the player is allowed to choose can be determined by the aforementioned choice determination program 60.

At step S13, a mini game is chosen at random from among a plurality of previously-prepared mini games.

Figures 16, 17:
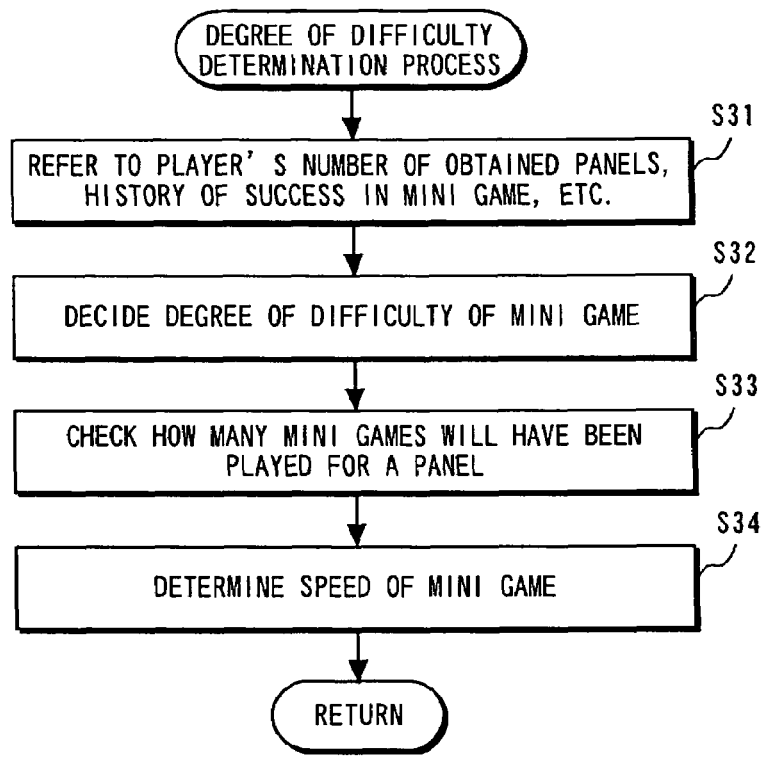
FIG. 16 is a flowchart illustrating the flow of a degree of difficulty determination process.
FIG. 17 is a diagram illustrating a method for determining a degree of difficulty of a mini game.

At step S14, the degree of difficulty of the mini game chosen at step S13 is determined, and at the following step S15, the mini game chosen at step S13 is executed with the degree of difficulty determined at step S14. With reference to FIG. 16, the details of a degree of difficulty determination process are described below.

In FIG. 16, after the degree of difficulty determination process starts, at step S31, the CPU 30 reads data corresponding to the number of panels possessed by a player who is choosing a panel at the moment and his or her history of success in a mini game(s), respectively from the number-of-each-player's-possessed-panels storage area 72 and the each-player's-success-history storage area 74 shown in FIG. 14.

Then, in accordance with the data which has been read, the degree of difficulty of the mini game is determined at step S32.

Figure 18A:
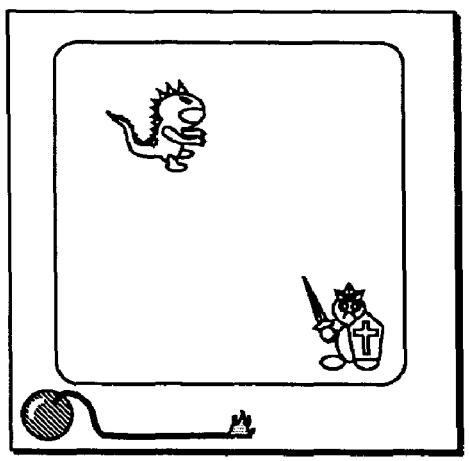
FIGS. 18A and 18B are exemplary screens for a mini game, the screens corresponding to different degrees of difficulty set for the mini game.
Figure 18B:
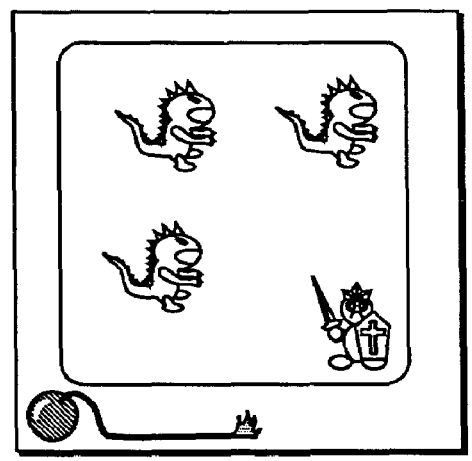
Figure 19A:
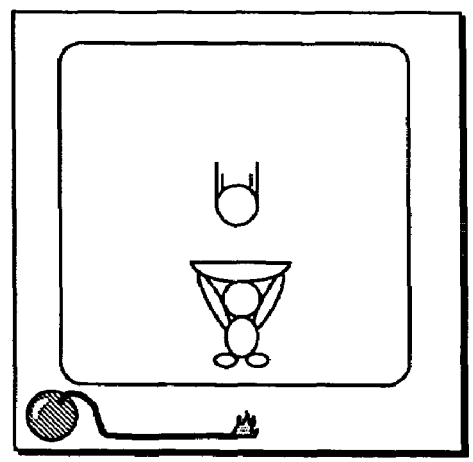
FIGS. 19A and 19B are exemplary screens for another mini game, the screens corresponding to different degrees of difficulty set for the mini game.
Figure 19B:
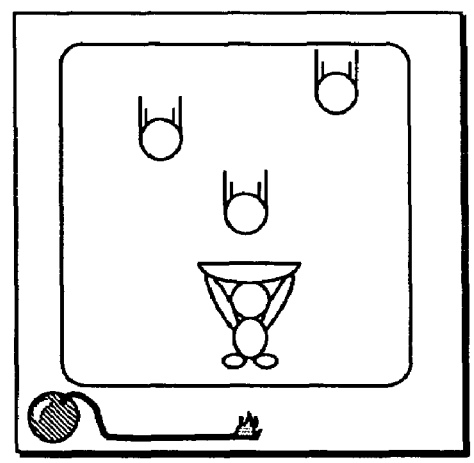

More specifically, in the illustrative embodiment, the degree of difficulty of a mini game is determined based on the two variables (a base variable and a bias variable) shown in FIG. 17. A base variable, which is a variable determined based on the number of panels possessed by each player, has an integer value ranging from 0 to 2. The base variable increases as the number of possessed panels increases. A bias variable, which is a variable determined based on the history of success in a mini game(s) up to the moment, has an integer value ranging from −2 to 0. A bias variable, whose initial value is zero, is reduced by one each time a player fails to clear a mini game (however, a bias variable cannot have a value less than −2). If the player successfully clears a mini game, the bias variable is reset to zero. The sum of the base variable and bias variable determines the degree of difficulty of the mini game. However, as is shown in FIG. 17, since any value equal to or less than zero is treated as zero, a value indicating the degree of difficulty of a mini game is zero, one, or two. In accordance with this degree of difficulty, a previously-arranged parameter of a mini game (which is, for example, a parameter indicating the number of monsters, a parameter indicating the number of obstacles serving to prevent a player from clearing the mini game, a parameter indicating the number of balls to be caught, or the like, and which may be a parameter specific to each mini game) is changed when the mini game is executed at step S15. For example, FIG. 18A shows an exemplary game screen when a mini game, of which the degree of difficulty is set to be zero, is being played, and FIG. 18B shows an exemplary game screen when the same mini game, of which the degree of difficulty is set to be two, is being played. In the same manner, FIG. 19A shows an exemplary game screen when a different mini game, of which the degree of difficulty is set to be zero, is being played, and FIG. 19B shows an exemplary game screen when the same mini game, of which the degree of difficulty is set to be two, is being played.

As has been described above, in the illustrative embodiment, it is so arranged that the degree of difficulty of a mini game is increased as the number of panels possessed by a player increases. Therefore, the probability is low that the development of the game becomes so one-sided that all panels are occupied by only one skilled player, and thus all players can enjoy playing the game. However, depending on the skill of a player, it may become almost impossible for the player to clear a mini game whose degree of difficulty is two. Accordingly, in the illustrative embodiment, the degree of difficulty of a mini game for a player is reduced directly after the player failed to clear a mini game (i.e., only if the player has failed to clear the immediately preceding mini game). Thus, a player under a handicap condition deriving from possessing many panels still has a non-zero chance to obtain more panels.

After the degree of difficulty of a mini game is determined at step S32 in FIG. 16, at step S33, the CPU 30 reads the aforementioned consecutively-played number data from the "other work area" shown in FIG. 14. Then, at step S34, the speed of the mini game is determined based on the consecutively-played number data. Specifically, the speed of the mini game is increased as the consecutively-played number becomes greater. Consequently, when a panel with a large stipulated number is chosen, the degree of difficulty (i.e., the speed) of a mini game will increase each time a mini game is cleared. For example, it will be difficult even for a player who is skilled in playing the mini games to obtain a panel whose stipulated number is set to be five in a straight-forward manner. If the player fails to clear a fifth mini game, the panel will be left to be easy for another player to obtain. As a result, a sophisticated strategy will be required in playing the game. For example, the player will be faced with the difficult question of whether to attempt to obtain a high-stipulated-number panel in a corner, which is difficult to obtain but which cannot be sandwiched by another player's panels, or to safely obtain a panel whose stipulated number is small.

At step S16 in FIG. 15, after a mini game is completed, the CPU 30 determines whether the result of the mini game satisfies the predetermined requirement for clearing the mini game. If it is determined that the predetermined requirement for clearing the mini game is not satisfied, the process proceeds to step S17. At this time the CPU 30 updates a mini game playing result history of the player who has played the mini game stored in the main memory 34. At step S17, in addition to transferring the right to choose a panel to the next player, the CPU 30 resets the consecutively-played number data to one, and thereafter, the process returns to step S12.

On the other hand, if it is determined at step S16 that the predetermined requirement for clearing the mini game is satisfied, the process proceeds to step S18. At this time, data stored in the main memory 34 is updated appropriately. Specifically, the mini game playing result history of the player who has played the mini game stored in the main memory 34 is updated, and the consecutively-played number data is incremented.

At step S18, the CPU 30 decrements the stipulated number for the panel that is being chosen at the moment.

At step S19, the CPU 30 determines whether the stipulated number for the panel that is being chosen at the moment is zero. If it is determined to be non-zero (i.e., equal to or greater than one), the process returns to step S13. Accordingly, the same player plays mini games in succession until he or she fails to clear a mini game or the stipulated number for the panel becomes zero.

On the other hand, if it is determined at step S19 that the stipulated number for the panel that is being chosen at the moment is zero, a process for granting the panel to the player who played the mini game is performed at step S20. Specifically, the number of remaining panels as stored in the main memory 34 is decremented. In addition, the number of panels possessed by the player is incremented and the player is memorized as the possessor of the newly obtained panel. Moreover, according to the panel reversal program 62 shown in FIG. 13, it is determined whether or not the panel at the center (panel P13) or another player's panel(s) exists between the panel newly obtained by the player and a panel already possessed by the player, and if such a panel exists, the possessor of that panel is changed.

Figure 20:
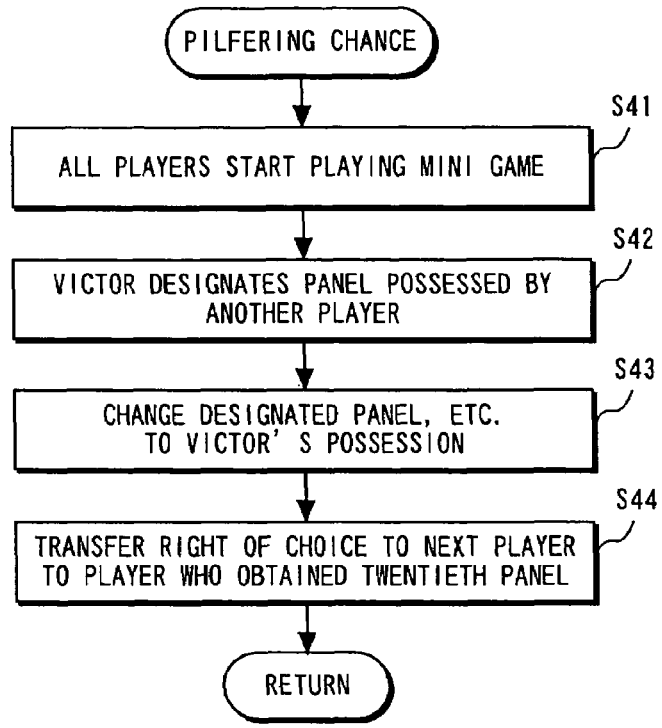
FIG. 20 is a flowchart illustrating the flow of processes at the time of a pilfering chance.

At step S21, the CPU 30 determines whether the newly obtained panel is a twentieth panel (in other words, whether the number of remaining panels stored in the main memory 34 is five) If the newly obtained panel is not the twentieth panel, the process proceeds to step S23, and if the newly obtained panel is the twentieth panel, a pilfering chance game is carried out at step S22. With reference to FIG. 20, the details of the process of a pilfering chance game are described below.

In FIG. 20, when a pilfering chance game is started, first at step S41, all of the players play a mini game as shown in FIG. 10. Note that at this time the degree of difficulty of the mini game played may be differentiated for each player. For example, such differentiations in the degree of difficulty of the mini game may be made according to the aforementioned base variables. The manner in which the victor in a pilfering chance game is determined has been described earlier. Then, at step S42, the victor designates a panel possessed by another player, and the possessor of the designated panel is changed to the victor at step S43. At this time if another player's panel exists between the panel the victor has thus obtained and a panel which has already been obtained by the victor, the sandwiched panel is added to the victor's possession. Then, the right to choose a panel is transferred to the player whose turn is supposed to come after the player who has obtained the twentieth panel (i.e., the next player after the player who obtained the last panel before the pilfering chance game), and the process returns to step S12. At this time, the consecutively-played number data is reset to one.

At step S23 in FIG. 15, the CPU 30 determines whether a newly obtained panel is a twenty-fifth panel (in other words, whether the number of remaining panels stored in the main memory 34 is zero). If the newly obtained panel is not the twenty-fifth panel, the process proceeds to step S17, and if the newly obtained panel is the twenty-fifth panel, the process proceeds to step S24.

At step S24, the CPU 30 determines whether a provisional victor has been determined. Specifically, the number of panels possessed by each player is compared with that of each of the other players, and if there is only one player who has obtained the greatest number of panels, that player is determined as a provisional victor, and the process proceeds to step S26. On the other hand, if there are a plurality of players who have obtained the greatest number of panels, a playoff game is played at step S25 to determine a provisional victor; based on the result of the playoff game a provisional victor is determined from among these players; and the process proceeds to step S26. Note that a playoff game may be of any kind. For example, a provisional victor may be determined by the players who have obtained the greatest number of panels playing an elimination game (s) similar to a pilfering chance game.

Figure 21:
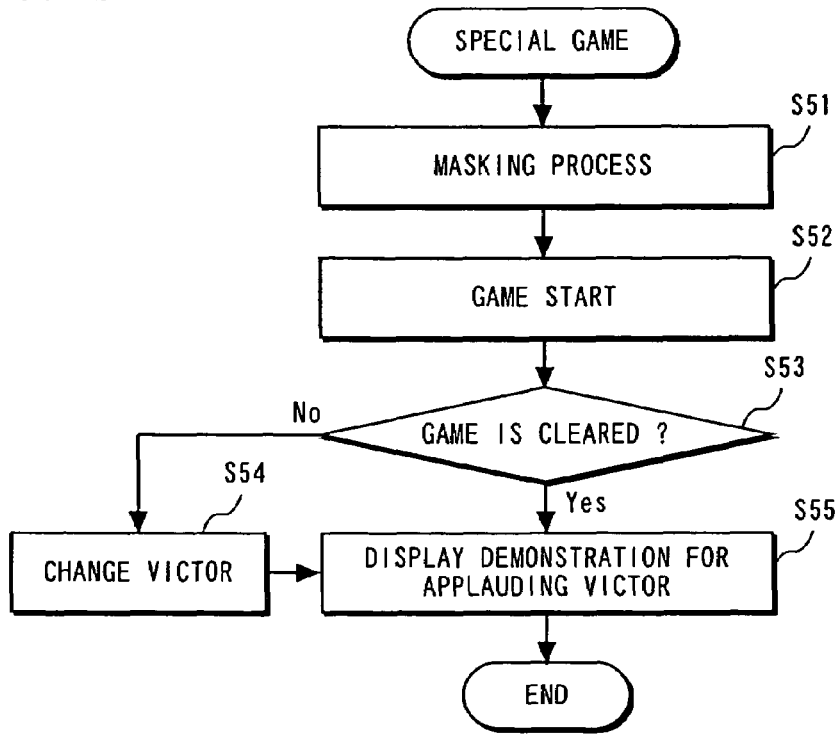
FIG. 21 is a flowchart illustrating the flow of processes at the time of a special game.

At step S26, the CPU 30 executes a special game for the provisional victor. With reference to FIG. 21, the details of the process of a special game are described below.

Figure 13:
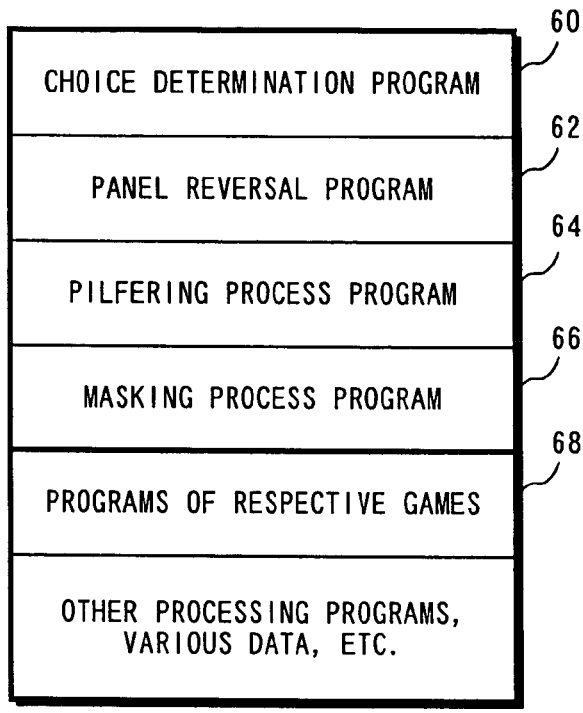
FIG. 13 is a memory map of a DVD-ROM.

In FIG. 21, after a special game is started, the CPU 30, first at step S51, masks the portions in the screen corresponding to the panels possessed by any player other than the provisional victor, based on the masking process program 66 shown in FIG. 13. Then, at step S52, a game (e.g., a mini game) is started with the aforementioned portions of the screen being masked. At the following step S53, it is determined whether the provisional victor has cleared the game, and if he or she has cleared the game, the provisional victor is determined as a final victor, and the process proceeds to step S55. On the other hand, if the provisional victor has not cleared the game, one of the players other than the provisional victor is determined as a final victor at step S54, and the process proceeds to step S55. One method for determining a final victor from among the players other than the provisional victor may be that the player who possesses the greatest number of panels among the players other than the provisional victor is determined as a final victor. At step S55, the CPU 30 displays a demonstration for applauding the final victor, and the game process is completed.

As described above, according to the illustrative embodiment, a game is realized whose development does not become monotonous and which players can enjoy playing even when the difference in competence between the players is large.

While the exemplary embodiments have been described in detail above, the foregoing is in all aspects only illustrative and is not meant to restrict the scope thereof. It is needless to say that various modifications or variations can be made without departing from the scope of the present invention.

What is claimed is:

1. A game apparatus for executing a game in which a plurality of players strive with one another to obtain one or more partial areas from among a plurality of partial areas constituting a predetermined area displayed on a game screen, comprising:
   a plurality of operation controllers to be operated by separate players;
   partial area selector programmed logic circuitry for allowing each player to choose a partial area in turns in a predetermined order;
   single-player-mode game execution programmed logic circuitry for, when a partial area is chosen, executing a single-player-mode game for a player who has chosen the partial area;
   obtained partial area adder programmed logic circuitry for, depending on a result of the single-player-mode game, storing the partial area chosen by the player who has played the single-player-mode game as an obtained partial area of the player in obtained partial area storage locations for storing a partial area obtained by each player as an obtained partial area;
   identifier programmed logic circuitry for providing the plurality of players with a game image representing a state of the obtained partial area, indicating the identity of the owner of said obtained partial area, wherein
   the players strive with one another to obtain one or more of said partial areas from among the same plurality of partial areas constituting a predetermined area displayed on said game screen during the same game, and
   stipulated number storage locations for storing a stipulated number which is assigned to each partial area, and stipulated number update programmed logic circuitry for reducing the stipulated number for the partial area as stored in the stipulated number storage locations if a result of the single-player-mode game executed when the partial area is chosen satisfies a predetermined requirement, wherein
   if a player plays a single-player-mode game and a result of the single-player-mode game satisfies the predetermined requirement, the single-player-mode game execution programmed logic circuitry executes another single-player-mode game for a same player in succession;
   if a player plays a single-player-mode game and as a result the stipulated number for a partial area in the stipulated number storage locations becomes zero, the obtained partial area adder programmed logic circuitry stores the partial area as an obtained partial area of that player in the obtained partial area storage locations; and
   if a result of the single-player-mode game does not satisfy the predetermined requirement or if a stipulated number for a partial area in the stipulated number storage locations becomes zero, the partial area selector programmed logic circuitry allows a next player to choose a partial area.

2. The game apparatus according to claim 1, wherein the single-player-mode game execution programmed logic circuitry chooses one single-player-mode game at random from among a plurality of previously-prepared single-player-mode games and executes the chosen single-player-mode game.

3. The game apparatus according to claim 1, further comprising play history information storage locations for storing, as play history information, a playing result of a single-player-mode game played by a player
   wherein, based on the play history information stored in the play history information storage locations, the single-player-mode game execution programmed logic circuitry executes a single-player-mode game with an increased speed of game progress as a number of single-player-mode games the player has played in succession increases.

4. The game apparatus according to claim 1 wherein different stipulated numbers are initially assigned to at least two of the plurality of partial areas in the stipulated number storage locations.

5. The game apparatus according to claim 1, further comprising obtained partial area changer programmed logic circuitry for changing, in the obtained partial area storage locations, a partial area of a player which is sandwiched between a partial area added by the obtained partial area adder programmed logic circuitry and a partial area which is already possessed by a player who has obtained the added partial area to become an obtained partial area of the player who has obtained the added partial area, wherein,
   the predetermined area and the plurality of partial areas are rectangular areas, and
   in the stipulated number storage locations, a larger stipulated number is initially assigned to a partial area placed in a corner of the predetermined area than for a partial area placed in a non-corner location of the predetermined area.

6. The game apparatus according to claim 1, wherein the single-player-mode game execution programmed logic circuitry executes a single-player-mode game having a degree of difficulty which varies according to a number of obtained partial areas of each player as stored in the obtained partial area storage locations.

7. The game apparatus according to claim 1, further comprising play history information storage locations for storing, as play history information, a playing result of a single-player-mode game played by a player
   wherein, the single-player-mode game execution programmed logic circuitry executes a single-player-mode game having a degree of difficulty which varies according to the play history information stored in the play history information storage locations.

8. The game apparatus according to claim 1, further comprising obtained partial area changer programmed logic circuitry for, if a player newly obtains a partial area and the newly obtained partial area is in a predetermined positional relationship with respect to an obtained partial area of another player, changing, in the obtained partial area storage locations, the obtained partial area of the other player to become an obtained partial area of the player who has newly obtained the partial area.

9. The game apparatus according to claim 1, further comprising:
   all-player-mode game execution programmed logic circuitry for executing an all-player-mode game which is capable of being played concurrently by all of the plurality of players in response to a prescribed number of partial areas having been obtained; and
   pilfering process programmed logic circuitry for changing, in the obtained partial area storage locations, an obtained partial area of a player to become an obtained partial area of another player based on a result of the all-player-mode game.

10. The game apparatus according to claim 1, further comprising:
    victor determination programmed logic circuitry for, when all of the plurality of partial areas contained in the predetermined area have been obtained by the plurality of players, determining one player of the plurality of players as a victor by considering the partial area or areas obtained by each player; and special game execution programmed logic circuitry for executing a single-player-mode special game which is executed for the victor on a game field corresponding to the predetermined area in which only portions corresponding to the obtained partial areas of the victor are made visible.

11. A storage medium storing a game program for causing a computer in a game system to execute a game in which a plurality of players strive with one another to obtain one or more partial areas from among a plurality of partial areas constituting a predetermined area displayed on a game screen, wherein, the game system includes a plurality of operation controllers to be operated by separate players, and the game program causes the computer to function as:

a partial area selector programmed logic circuitry for allowing each player to choose a partial area in turns in a predetermined order;

a single-player-mode game execution programmed logic circuitry for, when a partial area is chosen, executing a single-player-mode game for a player who has chosen the partial area;

an obtained partial area adder programmed logic circuitry for, depending on a result of the single-player-mode game, storing the partial area chosen by the player who has played the single-player-mode game as an obtained partial area of the player in obtained partial area storage locations for storing a partial area obtained by each player as an obtained partial area, and an identifier programmed logic circuitry for providing the plurality of players with a game image representing a state of the obtained partial area, indicating the identity of the owner of said obtained partial area, wherein the players strive with one another to obtain one or more of said partial areas from among the same plurality of partial areas constituting a predetermined area displayed on said game screen during the same game, wherein the game system further comprises stipulated number storage locations for storing a stipulated number which is assigned to each partial area, the game program further causes the computer to function as a stipulated number update programmed logic circuitry for reducing the stipulated number for the partial area as stored in the stipulated number storage locations if a result of the single-player-mode game executed when the partial area is chosen satisfies a predetermined requirement, if a player plays a single-player-mode game and a result of the single-player-mode game satisfies the predetermined requirement, the single-player-mode game execution programmed logic circuitry executes another single-player-mode game for a same player in succession, if a player plays a single-player-mode game and as a result the stipulated number for a partial area in the stipulated number storage locations becomes zero, the obtained partial area adder programmed logic circuitry stores the partial area as an obtained partial area of that player in the obtained partial area storage locations, and if a result of the single-player-mode game does not satisfy the predetermined requirement or if a stipulated number for a partial area in the stipulated number storage locations becomes zero, the partial area selector programmed logic circuitry allows a next player to choose a partial area.

12. The storage medium according to claim 11, wherein the single-player-mode game execution programmed logic circuitry chooses one single-player-mode game at random from among a plurality of previously-prepared single-player-mode games and executes the chosen single-player-mode game.

13. The storage medium according to claim 11, wherein, the game system further comprises play history information storage locations for storing, as play history information, a playing result of a single-player-mode game played by a player, and based on the play history information stored in the play history information storage locations, the single-player-mode game execution programmed logic circuitry executes a single-player-mode game with an increased speed of game progress as a number of single-player-mode games the player has played in succession increases.

14. The storage medium according to claim 11, wherein different stipulated numbers are initially assigned to at least two of the plurality of partial areas in the stipulated number storage locations.

15. The storage medium according to claim 11, wherein, the game program further causes the computer to function as an obtained partial area changer programmed logic circuitry for changing, in the obtained partial area storage locations, a partial area of a player which is sandwiched between a partial area added by the obtained partial area adder programmed logic circuitry and a partial area which is already possessed by a player who has obtained the added partial area to become an obtained partial area of the player who has obtained the added partial area, the predetermined area and the plurality of partial areas are rectangular areas, and in the stipulated number storage locations, a larger stipulated number is initially assigned to a partial area placed in a corner of the predetermined area than for a partial area placed in a non-corner location of the predetermined area.

16. The storage medium according to claim 11, wherein the single-player-mode game execution programmed logic circuitry executes a single-player-mode game having a degree of difficulty which varies according to a number of obtained partial areas of each player as stored in the obtained partial area storage locations.

17. The storage medium according to claim 11, wherein, the game system further comprises play history information storage locations for storing, as play history information, a playing result of a single-player-mode game played by a player, and the single-player-mode game execution programmed logic circuitry executes a single-player-mode game having a degree of difficulty which varies according to the play history information stored in the play history information storage locations.

18. The storage medium according to claim 11, further causing the computer to function as an obtained partial area changer programmed logic circuitry for, if a player newly obtains a partial area and the newly obtained partial area is in a predetermined positional relationship with respect to an obtained partial area of another player, changing, in the obtained partial area storage locations, the obtained partial area of the other player to become an obtained partial area of the player who has newly obtained the partial area.

19. The storage medium according to claim 11, further causing the computer to function as
- an all-player-mode game execution programmed logic circuitry for executing an all-player-mode game which is capable of being played concurrently by all of the plurality of players in response to a prescribed number of partial areas having been obtained, and
- a pilfering process programmed logic circuitry for changing, in the obtained partial area storage locations, an obtained partial area of a player to become an obtained partial area of another player based on a result of the all-player-mode game.

20. The storage medium according to claim 11, further causing the computer to function as
- a victor determination programmed logic circuitry for, when all of the plurality of partial areas contained in the predetermined area have been obtained by the plurality of players, determining one player of the plurality of players as a victor by considering the partial area or areas obtained by each player, and
- a special game execution programmed logic circuitry for executing a single-player-mode special game which is executed for the victor on a game field corresponding to the predetermined area in which only portions corresponding to the obtained partial areas of the victor are made visible.

21. The game apparatus according to claim 1, wherein each obtained partial area is being obtained by no more than one player at a given time.

22. The storage medium according to claim 11, wherein each obtained partial area is being obtained by no more than one player at a given time.

* * * * *